United States Patent [19]

Church

[11] Patent Number: 4,768,465
[45] Date of Patent: Sep. 6, 1988

[54] FLOORING FOR POULTRY PEN

[75] Inventor: Kenneth S. Church, Gimli, Canada

[73] Assignee: Faroex Ltd., Gimli, Canada

[21] Appl. No.: 48,252

[22] Filed: May 11, 1987

[51] Int. Cl.[4] .............................................. A01K 31/00
[52] U.S. Cl. ....................................... 119/22; 119/28
[58] Field of Search ............... 119/28, 22, 17; 404/28, 404/32, 35, 36; 52/126.1, 126.5, 126.6

[56] References Cited

U.S. PATENT DOCUMENTS

| | | | |
|---|---|---|---|
| 31,345 | 8/1861 | Schwartzkopff et al. | 119/28 |
| 1,238,349 | 8/1917 | Sloreve | 119/22 |
| 1,300,997 | 4/1919 | Moyers | 119/22 |
| 1,306,365 | 6/1919 | Webster | 119/22 |
| 2,856,897 | 10/1958 | Galinsky et al. | 119/22 |
| 3,726,255 | 4/1973 | Marr | 119/17 |
| 3,760,769 | 9/1973 | Erfeling | 119/22 |
| 3,771,495 | 11/1973 | Stevenson et al. | 119/17 |
| 3,861,108 | 1/1975 | Hartman | 119/28 |
| 3,950,908 | 4/1976 | Van Eyk | 52/169.1 |
| 4,430,960 | 2/1984 | Nagel et al. | 119/22 |

FOREIGN PATENT DOCUMENTS

| | | | |
|---|---|---|---|
| 1106248 | 4/1981 | Canada | 119/23 |
| 1098776 | 7/1981 | Canada | 119/33 |
| 1188578 | 11/1985 | Canada | 119/23 |
| 2085942 | 10/1980 | United Kingdom | 119/28 |

Primary Examiner—Gene Mancene
Assistant Examiner—R. Thomas Price
Attorney, Agent, or Firm—Adrian D. Battison; Stanley G. Ade

[57] ABSTRACT

Flooring for raising poultry and particularly broiler birds comprises a subfloor in the form of a grid formed by strips at right angles defining openings therebetween of the order of four inches across which will support the foot of a person but provides the openings for passage of waste material therethrough. An upper floor on top of the subfloor is formed of a molded grate or perforated flexible plastic sheet which is supported above the subfloor by vertical flexible pegs which are pressed into openings in the subfloor and are integral with the molded plastics floor. The pegs are resilient so that on compression by the foot of a person walking on the upper floor, the pegs compress completely so that the person walks effectively on the sub floor. The birds tend to sit between the pegs rather than on the pegs and thus flexible flooring cushions around them.

10 Claims, 2 Drawing Sheets

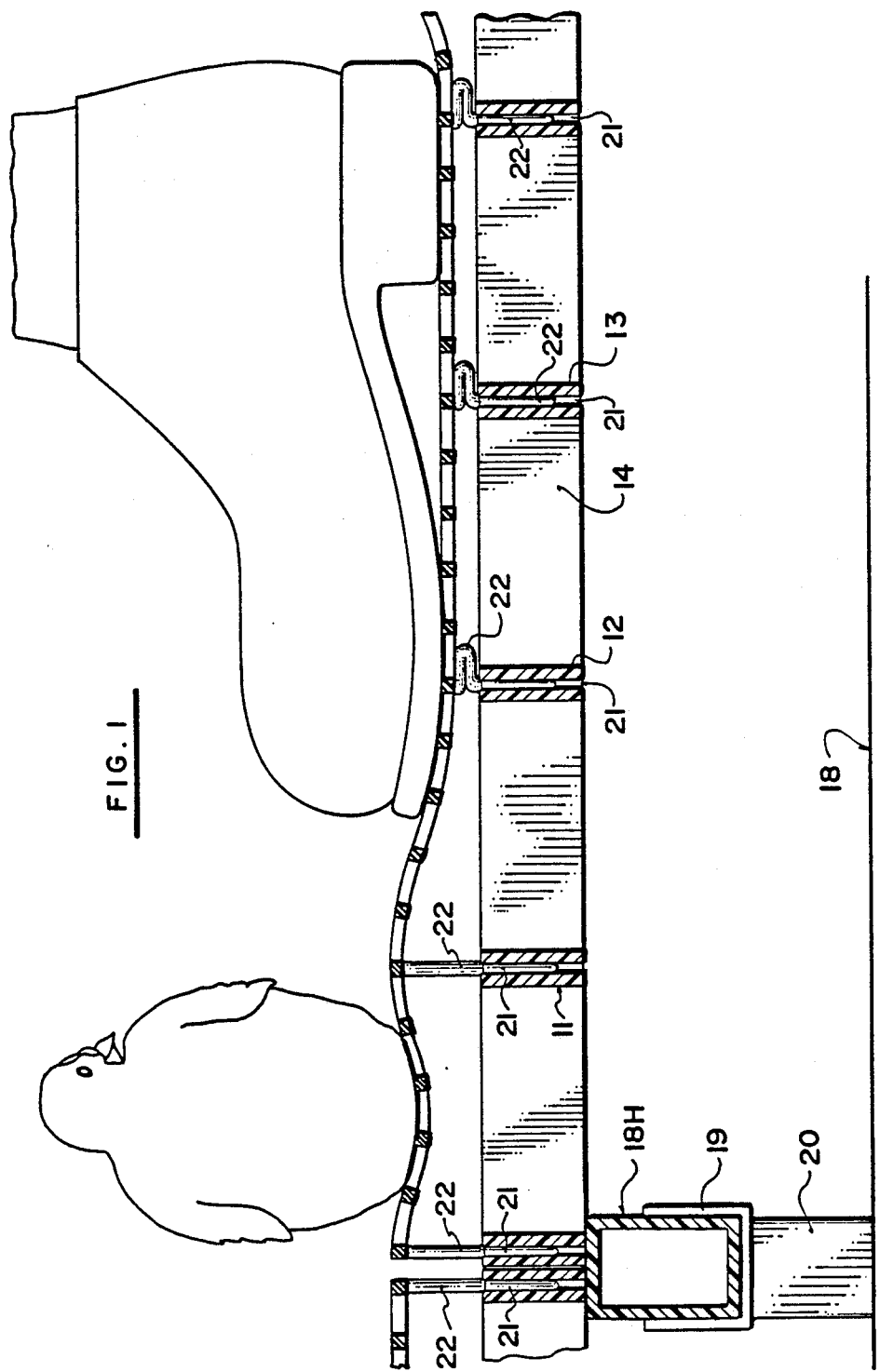

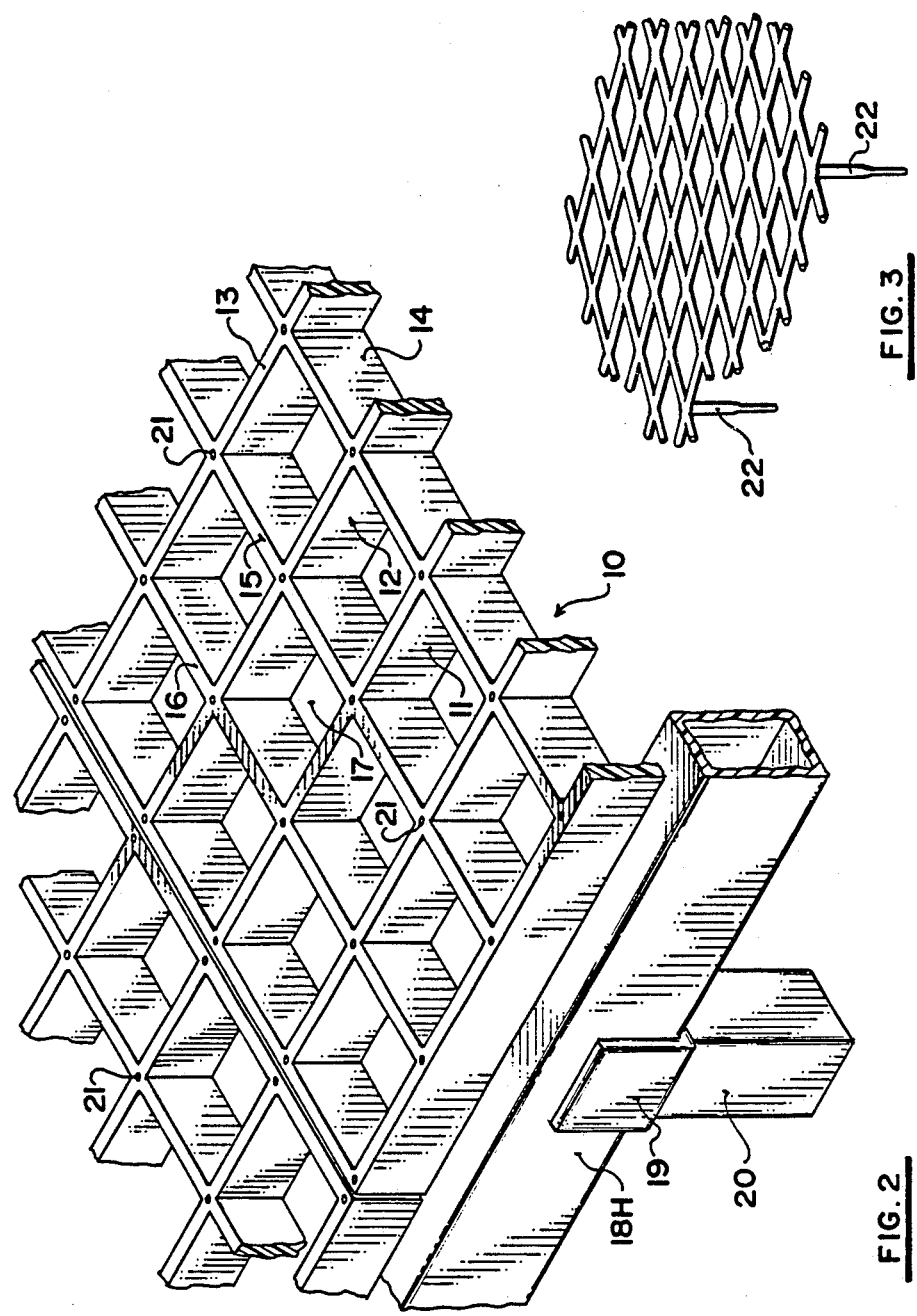

FLOORING FOR POULTRY PEN

BACKGROUND OF THE INVENTION

This invention relates to a flooring for a poultry pen.

Poultry and particularly broilers are generally raised from chicks to slaughter in the same pen in a matter of weeks. The birds are generally kept in relatively high densities within a single pen which is merely of sufficient size to enable them to move about within the pen. During their life they spend much of their time resting on the floor with their breast directly in contact with the floor.

In most cases the floor is constituted simply by an earth or concrete base covered with straw or other suitable bedding materials on which the waste material or feces merely collects. As this type of floor provides great difficulty for the operatives removing the waste material and generally the floor is left untouched for the period of growth of a particular batch of birds and the material is removed only when the batch is fully grown and removed from the pen.

It is of course necessary for the operatives to move about on the floor at the same time as the birds are on the floor in order to carry out regular culling of dead or damaged birds, to repair feeding or watering equipment and in order to catch and crate the birds for transportation to slaughter.

The above use of the solid, straw or shavings covered floor allows the operatives to move about freely but can cause problems with infection and disease caused by the collection of the waste materials or flooding from watering system breakdowns. In addition the waste material retains a useful amount of feed material since it contains nutrients which could if collected be used in subsequent feeding to ruminant type livestock. However the fact that collection can take place only after the few weeks of the growth period prevents the material being used since this delay results in the development of botulism and other harmful bacteria which destroys the usefulness of the manure.

Another problem which arises is that medication is required in the feed, i.e., antibiotics, to help the bird cope with living on its own feces. These medicated feeds can result in (1) excess cost (2) contaminated meat and human allergic reaction.

Various designs of manufactured flooring have therefore been developed over the years to attempt to allow the collection of the waste material beneath the floor for removal and further use regularly without disturbing the flock above. Examples are shown in U.S. Pat. Nos. 3,371,495 (Stevenson et al), 4,430,960 (Nagel) and Canadian Pat. No. 1,188,578 (Nijhof). In many cases this type of flooring does not allow an operative to properly enter the area where the birds are kept so as to provide the necessary culling or catching of the birds. In some cases this is overcome by providing as the flooring a conveyor belt which will move toward one end at which the birds can be grasped or dead birds removed.

However this type of flooring in many cases has a severe disadvantage that is the birds tend to sit upon transverse wires or strips which support the floor and thus cause indentation in the breast resulting in crooked keel bones and in some cases unsightly breast blisters which are unacceptable in broilers and require the birds to be culled due to health standards and to be used only for soup. Little success has therefore been obtained in providing a flooring which overcomes all of these requirements and while many of the new designs of flooring have been tried, very little commercial success has been attained.

SUMMARY OF THE INVENTION

It is one object of the present invention, therefore, to provide an improved flooring for poultry pens of a type which allows operatives to walk on the floor to carry out their regular duties, which provides openings or perforations in the floor to allow waste material to fall through the floor for collection on a suitable horizontal base and yet which allows the birds to rest on the floor without damaging the all important breast area for high quality product.

According to the invention, therefore, there is provided a flooring for supporting birds in a poultry pen comprising a rigid subfloor providing sufficient strength to support a person standing thereon, said subfloor comprising a grid defined by a first plurality of generally parallel strip members and a second plurality of generally parallel strip members arranged to cross the first plurality at an angle thereto so as to define open spaces between the strip members of a size sufficiently large to allow waste material to fall therethrough, and sufficiently small to allow a foot of a person to span from one strip member to a next adjacent strip member without falling between the two a flexible perforated floor arranged to extend across said subfloor, and a plurality of spaced substantially vertical strut means extending between said strip members of said grid and said flexible perforated floor for supporting said floor at a position spaced above said subfloor, said strut means being sufficiently rigid to appear to a bird as a rigid projection and sufficiently flexible to collapse when compressed by the foot of a person, said strut means and said strip members being spaced to define above each open space in the grid a portion of said flexible floor which can flex when receiving a bird resting thereon to curve around the bird.

The rigid subfloor therefore provides enough strength for the operatives to walk on the subfloor with the grids in the subfloor being of the order of 4 inches in transverse dimension so that the operatives can readily place his feet on the subfloor without danger of falling through. The upper flexible flooring, when the operative walks on the floor, compresses so that in effect he is walking merely on the subfloor with the flexible flooring compressed fully down to the subfloor.

The situation from the point of view of the bird is however totally different in that the strut means are sufficiently rigid so that the strut means apears to the bird as a rigid peg or post which is holding up the flexible flooring. Preferably the pegs or posts are spaced at the crossing points of the grid thus defining between four such pegs a rectangular area of the order of 4 inches in transverse dimension which is sufficiently large to receive the body of a sitting bird. The pegs or posts appear to the bird to be rigid and hence tend to inhibit roosting of the bird directly on top of a peg since it appears to the bird as a wobbly post with the bird therefore tending to sit between the pegs in the unsupported area therebetween. The upper floor is sufficiently flexible so that it bows under the weight of the bird and thus gently cushions the bird in a "cupping form" in its preferred perch.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a transverse cross sectional view showing a portion of the flooring carrying a bird at one point on the flooring and receiving the foot of a person on another point on the flooring.

FIG. 2 is an isometric view of the subfloor and subframe of the flooring of FIG. 1.

FIG. 3 is an isometric view showing a small portion of the upper flexible floor of the embodiment of FIG. 1.

In the drawings like characters of reference indicate corresponding parts in the different figures.

DETAILED DESCRIPTION

The subfloor and subframe is illustrated in FIGS. 1 and 2. The subfloor comprises a grid 10 formed by parallel strip members 11, 12, 13 which cross at right angles with a plurality of further parallel strip members 14, 15, 16 to form a complete grid of rectangular cells defining openings 17 therebetween. Each strip member is designed in height, width and material so as to maximize the size of openings 17 defined therein so that any waste material can readily fall through onto a lower base 18. In practice the height of the strip members may be of the order of 1½ to 2½ inches and the width of the order of ¼ inch with the grid formed from suitable thermoplastic plastics materials by injection molding, or from any other suitable noncorrosive plastics or fiber reinforced plastics material.

The grid constituting the subfloor is supported on the subframe consisting of a plurality of spaced parallel horizontal beams 18H which are preferably formed by pultrusion to form a hollow rectangular cross section. The beams are supported upon a plurality of cast plastics yokes 19 one of which is shown which includes a vertical leg 20 so that the subfloor is supported at a sufficient distance from the base 18 to allow clearing of any collected waste material which falls through the subfloor onto the base.

The subfloor is formed in sections which may be for example approximately two feet square with the side of the sections being equated to the spacing between the beams 18H so that the junction between the sections can sit upon the upper surface of the beam 18H. It will be appreciated therefore that the whole of the subfloor and subframe can be simply manufactured from plastics materials using conventional techniques to form a corrosion resistant, easily assembled structure.

The openings 17 of the subfloor are sufficiently small that a foot of a person can span from one strip member to the next without falling therethrough; a spacing of the order of 4 inches is suitable.

An upper floor is shown in FIGS. 1 and 3 and is formed of a molded grate having the appearance of expanded plastic material, that is a soft flexible relatively thin plastics material which has slots punched or formed therein so as to allow it to be open and flexible. Other forms of soft plastics material may also be used including ones which have holes molded therein. The holes are very much smaller in size and very much larger in number than the holes in the grid of the subfloor. The degree of flexibility of the floor is such that it will curve around the breast of the bird to cup the bird.

The plastics material floor has formed integrally therewith a plurality of pegs or small struts projecting downwardly from an underside thereof. In practice the pegs have a height of the order of one inch or more merely to space the upper floor away from the subfloor sufficiently so that a bird sitting on the flexible floor cannot obtain pressure against his body from any part of the subfloor.

The pegs are formed also of the soft flexible plastics material from which the floor is molded so that they are themselves flexible. Their dimension is chosen so that under a force of less than the weight of the bird for which the flooring is designed they remain effectively rigid and upright. They are however totally flexible so that under a force significantly greater than the bird weight, they are totally compressed. It will be appreciated that the flooring can be designed for small broilers of up to 4 lbs. in weight or for large turkeys which can reach 40 lbs. in weight or for weights in between. In each case the flexibility of the floor and the pegs will need to be designed and constructed to accommodate the above functional requirements.

The grid forming the subfloor, has indicated at 21 a plurality of small holes formed in the upper surface at the crossing points between the right angled strip members. The pegs are configured and arranged on the underside of the floor so that each peg indicated at 22 has a lower end which can engage into a respective one of the holes 21 as a press fit so that it is retained in proper position resting upon the grid even when the floor is flexed by passing birds or passing persons. Adhesive may be used to more firmly fix the lower end of the peg 22 in place in the hole 21 when the flooring is laid onto the subfloor. Alternatively the peg and opening may be shaped as a snap fastener arrangement or simply the hole may receive the pin relaying on gravity to maintain its position.

In a yet further alternative arrangement the pegs may be formed separately from both the subfloor and the flooring and then again be pressed into place in openings in the subfloor and then merely support the flooring above the subfloor by contact therewith or be pressed into holes or recesses in the underside of the floor.

As it will be seen in FIG. 1 the action of a foot of a person on the flooring is merely to fully compress the pegs so that the person is effectively standing upon the grid of the subfloor. The resilience of the pegs however of course will act to spring the upper floor back into place when the foot is removed.

The bird tends to sit between the pegs in the pocket defined by the open area above the opening of the grid. In this area the support for the bird is provided by the bowing of the floor so that it curves around the birds breast. A deviation of the floor by as much as the height of the pegs can be accepted to provide the maximum "cupping" while holding the bird away from contacting the rigid subfloor.

The birds tend to sit in the spaces between the pegs rather than on the pegs because the pegs themselves appear to the bird as single wobbly post thus inhibiting perching on that post. Birds are of course well skilled in perching on transverse beams of wires but are inhibited by the single wobbling post which has, as explained above, sufficient rigidity to appear as a rigid post but will wobble from side to side due to the flexibility of the floor.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A flooring for supporting birds in a poultry pen comprising a rigid subfloor providing sufficient strength to support a person standing thereon, said subfloor comprising a grid defined by a first plurality of generally parallel strip members and a second plurality of generally parallel strip members arranged to cross the first plurality at an angle thereto so as to define open spaces between said first and second plurality of strip members of a size sufficiently large to allow waste material to fall therethrough, and sufficiently small to allow a foot of a person to span from one strip member to a next adjacent without falling therethrough, a flexible perforated floor arranged to extend across said subfloor, and a plurality of spaced substantially vertical strut means extending between said strip members of said grid and said flexible perforated floor for supporting said flexible floor at a position spaced above said subfloor, said strut means being sufficiently rigid to appear to a bird as a rigid projection and sufficiently flexible to collapse when compressed by the foot of a person, said strut means and said strip members being spaced to define above each open space in the grid a portion of said flexible floor which can flex when receiving a bird resting thereon the curve around the bird.

2. The invention according to claim 1 wherein said strut means are attached to said flexible floor.

3. The invention according to claim 1 wherein the strut means are formed integrally with the flexible floor.

4. The invention according to claim 1 wherein the said strut means, fit in apertures formed in said flexible floor.

5. The invention according to claim 1 wherein said first and second plurality of strip members include a plurality of spaced holes in upper surfaces thereof each to receive a lower end of a respective strut means to retain said strut means in contact with said first and second plurality of strip members.

6. The invention according to claim 5 wherein the holes are provided at the points of crossing of said first and second plurality of strip members.

7. The invention according to claim 1 wherein said flexible floor is formed of an expanded plastics material.

8. The invention according to claim 1 wherein the flexible floor is formed of a sheet material having therein a plurality of slots allowing the sheet material to be open at the slots for passage therethrough of waste material from the birds.

9. The invention according to claim 1 including a subframe formed by a plurality of spaced parallel horizontal beams wherein said subfloor is formed in sections with two of the edges of each section resting upon respective edges of said beams.

10. The invention according to claim 1 wherein said flexible floor is formed of a molded plastics material having molded therein a plurality of openings.

* * * * *